United States Patent [19]

Yates, Jr. et al.

[11] Patent Number: 5,045,992

[45] Date of Patent: Sep. 3, 1991

[54] APPARATUS FOR EXECUTING INSTRUCTION REGARDLESS OF DATA TYPES AND THEREAFTER SELECTIVELY BRANCHING TO OTHER INSTRUCTION UPON DETERMINING OF INCOMPATIBLE DATA TYPE

[75] Inventors: John S. Yates, Jr.; Stephen J. Ciavaglia, both of Nashua, N.H.

[73] Assignee: Hewlett-Packard Company, Palo Alto, Calif.

[21] Appl. No.: 259,792

[22] Filed: Oct. 19, 1988

[51] Int. Cl.[5] .................... G06F 7/38; G06F 9/302; G06F 9/305; G06F 9/308
[52] U.S. Cl. ............................ 364/200; 364/258; 364/259.8; 364/261.3; 364/262.4; 364/262.8; 364/937.1; 364/938; 364/947.5; 364/951.5
[58] Field of Search ... 364/200 MS File, 900 MS File, 364/468, 132, 521, 748; 198/341, 358; 371/53, 40.1; 377/15

[56] References Cited

U.S. PATENT DOCUMENTS

| | | | |
|---|---|---|---|
| 4,068,299 | 1/1978 | Backman | 364/200 |
| 4,241,397 | 12/1980 | Strecker et al. | 364/200 |
| 4,445,177 | 4/1984 | Bratt et al. | 364/200 |
| 4,467,409 | 8/1984 | Potash et al. | 364/200 |
| 4,491,908 | 1/1985 | Woods et al. | 364/200 |
| 4,757,445 | 7/1988 | Zolnowsky et al. | 364/200 |
| 4,785,393 | 11/1988 | Chu et al. | 364/200 |
| 4,797,808 | 1/1989 | Bellay et al. | 364/200 |

*Primary Examiner*—Thomas C. Lee
*Assistant Examiner*—Ayni Mohamed
*Attorney, Agent, or Firm*—Weingarten, Schurgin, Gagnebin & Hayes

[57] ABSTRACT

A method and apparatus for improving the efficiency of executing arithmetic and logical operations performed on arguments provided during the execution of computer instructions in which operands include a variable type argument or data portion accompanied by a tag identifier which defines the data type. The processing of the data is enhanced by the addition of two condition codes derived from the values of the pre-ALU tag identifiers and the post-ALU results. The condition codes allow rapid determination of data types without additional execution cycles or hardware overhead, resulting in enhanced execution of the instructions.

12 Claims, 1 Drawing Sheet

APPARATUS FOR EXECUTING INSTRUCTION REGARDLESS OF DATA TYPES AND THEREAFTER SELECTIVELY BRANCHING TO OTHER INSTRUCTION UPON DETERMINING OF INCOMPATIBLE DATA TYPE

FIELD OF THE INVENTION

The present invention relates to computer processor execution units, in particular to computer processor execution units responsive to programmed processing of multiple typed datum having corresponding tag information included therein.

BACKGROUND OF THE INVENTION

In Lisp language systems, the data is tagged and variables are not compile-time typed. The type of datum can be determined within executable code and datum of any type can be assigned to a variable. Tagging is typically implemented using tagged pointers. Since pointers are so important in Lisp, they are used as economically as possible. For instance, an economy is achieved by combining the address represented by the pointer with bits in the pointer that denote its type. In Lucid's Common Lisp (LCL) and Domain Lisp (DL), this is done by reserving the low 3 bits for tag, aligning all data on 8-byte boundaries, and using displacements on all indirect addresses to "mask" the tag. This method is used by LCL, DL, and Yale's T, and has shown to be a reliable, efficient and extensible technique for pointer-tagging on general purpose machines.

Use of tagging implies a corresponding need for good bit-field manipulators. Although tags can be masked as part of an indirection operation, a tag must be examined to ascertain a type or massage a type, confirming the need for efficient bit-field operations.

The Lisp universe is traditionally thought of as made up of atoms and list cells. Although this view is a correct semantic model, in real Lisp applications, computation on small integers is so common they are considered a special case. Thus, at the lowest level of implementation, there are actually three kinds of objects in the Lisp universe:

CONS-CELLS: the 2 pointer cells from which lists are constructed;

SMALL-INTS: small signed integers, about the size of a pointer bereft of its tag bits; and OTHER: blocks of storage with extended tags.

A typical assignment of meaning to the three low bit tag values is shown as follows:

000: 30 bit even integer (29 high order bits concatenated with the most significant tag bit (=0)
001: pointer escape (tagged non-arithmetic block or storage)
010: number escape (floating or infinite precision fixed-point)
011: pointer to cons cell
100: 30 bit odd integer (29 high order bits concatenated with the most significant tag bit (=1)
101: symbol escape (property list, value cell, etc.)
110: other immediate escape (i.e., non-integer; e.g.: single character)
111: unused (forwarding-pointer if supported by hardware)

Because Lisp is not statistically typed and because functions are defined to operate polymorphically by checking type tags, executing Lisp code repeats the following sequence
enter function
(this code is very frequently expanded in-line)
case on tags of arguments
(some or even many tag values may represent type errors)
perform appropriate operation based on result of the case analysis.

Though in theory the code for any function must be prepared to cope with arguments of arbitrary type, either by executing different code based on a type dispatch or by detecting and signalling a type error, for almost all functions a unique type accounts for the overwhelming majority of all cases actually encountered. This is most especially true for the fundamental cases of CAR, CDR and the basic arithmetic functions.

SUMMARY OF THE INVENTION

This invention features a method and apparatus for improving the efficiency of executing arithmetic and logical operations performed on variable type arguments or operands, each of which include a data portion and a tag identifier portion. The are provided during the execution of associated computer program instructions. The present invention allows the execution unit of a system, such as a computer system, to perform the arithmetic or logical operation optimistically presuming a predetermined data type such as an integer. The method and apparatus dynamically determines the operand type by generating and testing condition codes generated by the operand tag identifiers and post arithmetic logic unit results. Thus, the condition codes allow for the rapid determination of operand types without additional execution cycles or hardware overhead and regardless of whether the instruction is a proper instruction for the given operands, resulting in enhanced processing efficiency.

In one embodiment, the method and apparatus of the present invention optimistically assumes that the operands are integers, and proceeds to execute the given instruction on first and second operands as if they were integers. Simultaneously, the system hardware examines the tag identifiers accompanying each operand and generates a condition code (L2) which is utilized to formulate condition code predicates and control computer program instruction branching upon the detection of non-integer operands. Thus, in the great majority of instances such as in the execution of lisp computer instructions wherein most data types are integers, enhanced execution of computer program instructions is achieved by eliminating off-line data type determination.

In another embodiment, the method and apparatus of the present invention allows an arithmetic logic unit to process the two operands according to a predetermined instruction such that an examination of a specified number of least significant bits from the result of the arithmetic logic unit yields a condition code (Z3) indicative of whether one or both of the operands were non-integer types.

BRIEF DESCRIPTION OF THE DRAWINGS

These and other features according to the present invention will be better understood by reading the following detailed description, taken in conjunction with the drawing, wherein.

DETAILED DESCRIPTION OF THE INVENTION

Figure 1:
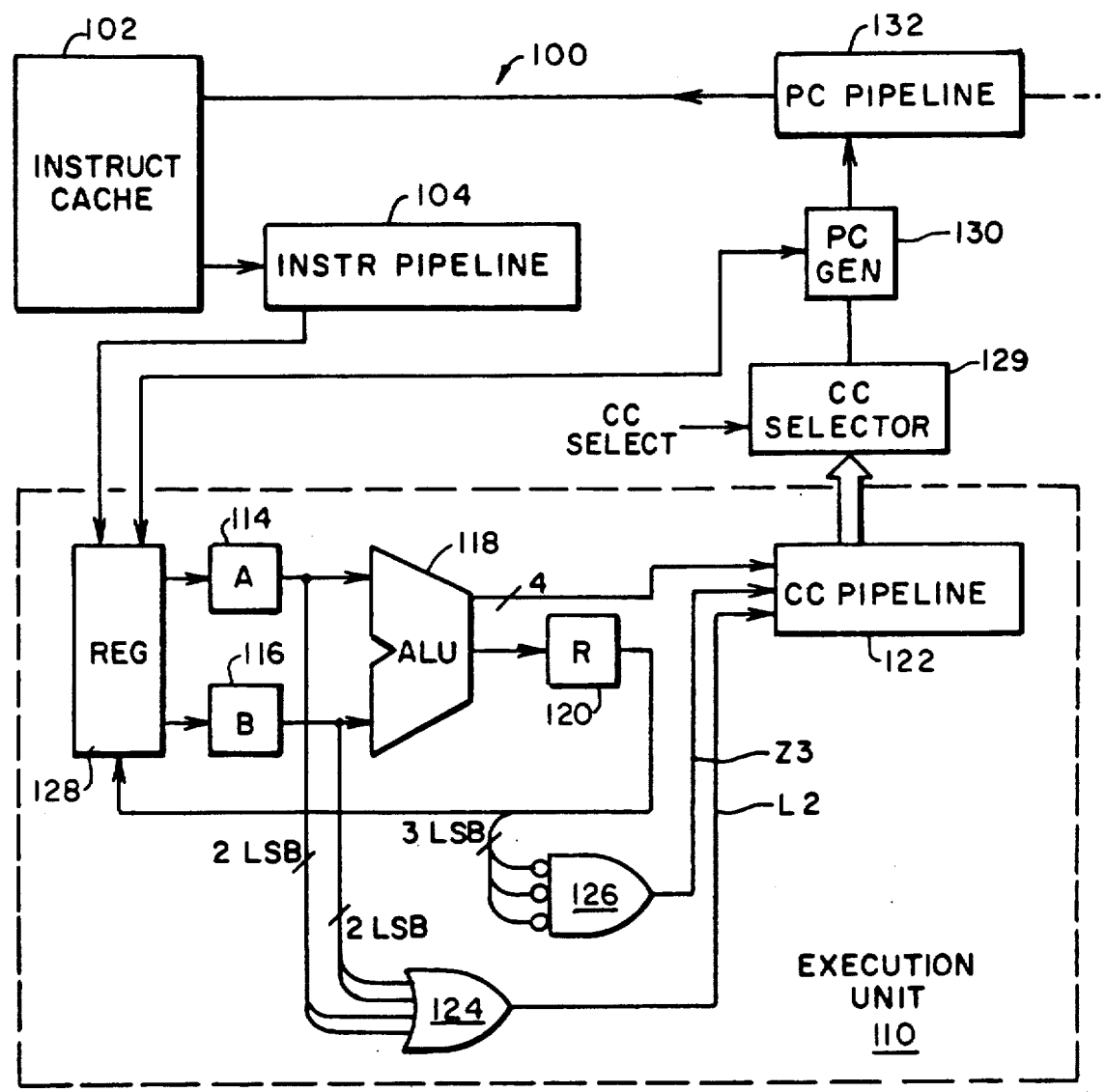
FIG. 1 is a block diagram of the system according to the invention.

The apparatus and method according to the present invention is applicable to the processor shown in co-pending U.S. patent application Ser. No. 07/255,105, entitled METHOD AND APPARATUS FOR CONCURRENT DISPATCH OF INSTRUCTIONS TO MULTIPLE FUNCTIONAL UNITS, filed Oct. 7, 1988, or one of other known processor architecture having an execution unit 110 receiving a sequence of instructions, from a source, such as the instruction cache 102 or other memory storage locations having a sequence of instructions stored therein, provided in response to a sequentially provided address signal typically provided by a program counter or a program counter generator 103 in combination with a program counter pipeline 132. The instructions provided by the instruction cache 102 may issue directly into the register 112, part of the execution unit 110, or temporarily reside in an instruction pipeline (INSTR pipeline) 104, as may be provided by examples known in the art. The execution unit 110, shown in FIG. 1 includes an A operand register 114, a B operand register 116, and arithmetic logic unit (ALU), 118 receiving the operands A and B in registers 114 and 116, respectively. The ALU 118 provides a result stored in register (R) register 120. The results stored in 120 is received by register file (REG) 112 and may be selectively provided to one of the operand registers 114, 116 according to the instruction received from the instruction cache 102 via the instruction pipeline 104.

As explained in co-pending U.S. patent application Ser. No. 07/259,345, entitled CENTRAL PROCESSOR CONDITION CODE AND APPARATUS, filed Oct. 18, 1988, incorporated by reference, discussing the condition code pipeline 122, the arithmetic logic unit provides a four STET bit condition code (N, Z, V, C) coincidental with the result stored in register 120 to the condition code pipeline 122, to which condition codes L2 and Z3 are added. The state values of the condition codes in the pipeline are received by the program counter generator (PCGEN) 130 which provides subsequent program counter instruction addresses to the program counter (PC) pipeline 132 in response to the condition codes provided by the pipeline 122 and any branch destination address signals provided by the register file 112.

According to one aspect of the present invention, a logical element 124, comprising a four input OR gate receives the two least significant bits of the operands provided by each of the registers 114 and 116. According to one application of the present invention, the least significant three bits of the operands stored in the registers 114 and 116 comprise tag identifier bits wherein integer status of the operands is indicated by the zero values in the lower two significant bits. Accordingly, when both operands in registers A and B, 114 and 116, respectively, comprise integer values, the least significant bits have a zero value, resulting in a logical zero state of the output of the OR gate 124, which producing on L2 condition code is received by the condition code (CC PIPELINE) 122. The program counter generator (PC GEN) 130 provides the successive program counter signals to the program counter (PC) pipeline 132 in response to the condition codes stored in condition code pipeline 122. When processing numeric data within a Lisp program, the vast majority of signals provided by the operand registers 114 and 116 comprise integer values, resulting in a logical zero in the output of OR gate 124, L2 having a value of zero. The operand relatively infrequently comprises a different type, such as a numeric scope, which results in a non-zero value of L2, at the output of the OR gate 124. According to the present invention, the non-zero value, incorporated into the condition code pipeline 122 and received, along with other single bit and composite condition codes by condition code selector (CC SELECTOR) 129. The selected condition code or composite condition codes which are received by the program counter generator 130 results in an alteration of the stream of instructions provided by the instruction cache 102 to the execution unit 110 as is well known in the art, such that the non-integer datum received in one or both of the operand registers 114 and 116 is processed according to their actual type.

More specifically, the system apparatus and method according to the present invention adds a Lisp specific L2 condition code as provided by four (4), equal to the logical OR of A[0], A[1], B[0] and B[1]; and four new BR_COND predicates equal to L2, L2, (L2+V) and (L2+V). Thus, in one example, the Lisp language program code for random arithmetic on integers may be reduced from:

| LIST 1 | | |
|---|---|---|
| | EXTRACT.cc Ra,#0,#1,R31 | ; verify Ra[1:0] = 00 |
| | EXTRACT.cc Rb,#0,#1,R31 | ; verify Rb[1:0] = 00 |
| | BEQ.sf 1S | |
| | SVC #trap-code | ; Ra → BIGNUM or type error |
| 1S | BEQ.sf 2S | |
| | SVC #trap-code | ; Rb → BIGNUM or type error |
| 2S | operate.cc Ra,Rb,Rc | ; perform actual computation |
| | BNV.sf 3S | |
| | SVC #trap-code | ; overflow, generate BIGNUM |
| 3S | | | to the following example

| LIST 2 | |
|---|---|
| operate.cc Ra,Rb,Rc | ; perform actual computation |
| BXX.sf 1S | |
| SVC #trap-code | ; if overflow generate BIGNUM |
| 1S | ; else trap a type error |

The actual improvement is better than even these code fragments suggest since integer arithmetic is handled in the prior art by calls to out-of-line routines; while according to the present invention, the combination of the L2 bit condition codes and the new BR COND predicates allows executions of in-line integer code.

Another aspect of the present invention, operable coincidental or independent of the aforementioned OR logic gate 124 comprises a three-input AND logic unit 126 which provides an ANDED combination of the complement of the three least significant bits of the signal provided by the result (R) register 120. The output of the logic element 126, providing a logical signal for condition code labeled Z3, provides a logical high level output when the three least significant bits of the result signal is zero. The condition code signal Z3 is also received by the condition code pipeline, causing a corresponding modification in the sequence of instructions provided by the instruction cache. According to the present invention, a program instruction sequence frequently requires the verification of a tag in one of the A and B operands, wherein such tag verifications are provided by a subtraction or other logical combination of one operand's tag bits with a 3 bit value in the other operand, being analogous to the commonly used branch on zero test used to verify a stored value. Thus, the apparatus according to the present invention allows testing of a tag value without requiring an explicit step to isolate the tag from the remainder of the datum.

Thus, the new Z3 condition code equal to the 3-way NOR over the low 3 bits out of the result register 120 and two new BR-COND predicates 23 and 23, would reduce a tag comparison from the following example:

---
LIST 3

EXTRACT Ra,#0,#2,Rb
SUB.cc #tag,Rb,R31
—
BEQ/BNEQ label
--- to the following example:

---
LIST 4

SUB.cc #tag,Rb,R31
—
BZ3/BNZ3 label          ; or possibly SVC
---

Modifications and substitutions made by one of ordinary skill in the art are considered to be within the scope of the present invention, which is not to be limited except by the claims which follow.

What is claimed is:

1. A processor execution unit, for identifying and processing integer and non-integer data types, comprising:
   means for providing first and second operands, each of said first and second operands including a data portion and a tag identifier portion, said tag identifier portion of each of said first and second operands comprised of a specified number of least significant bits of each of said corresponding first and second operands, for identifying the corresponding operand data portion as one of integer and non-integer data types;
   means for sequentially providing processor instructions, at least one of said processor instructions defined as a proper instruction, said proper instruction properly executable on first and second operands having integer type data portions only;
   arithmetic logic unit means, for sequentially receiving first and second operands and an associated processor instruction, and for providing a result according to said first and second operands and said associated processor instruction, said arithmetic logic unit means providing said result regardless of whether a given associated processor instruction is a proper instruction; and
   a first operand identifier unit, responsive to said specified number of least significant bits from each of said first and second operands, for identifying the data type of at least one of said first and second operands, and for providing a first, single bit condition code in response to the data type identification of said at least one of said first and second operands, said first, single bit condition code provided simultaneously with and independent of said result provided by said arithmetic logic unit means, said first condition code forming at least part of a processor instruction branch indicator, for indicating that an improper processor instruction was executed in conjunction with at least one of said first and second operands, and for altering the sequence of processor instructions provided by said means for sequentially providing processor instructions.

2. The execution unit of claim 1 wherein integer type data portions of said first and second operands are identified by a corresponding zero value for each of said specified number of least significant bits in each corresponding tag identifier portions of said operands.

3. The execution unit of claim 2 wherein said specified number of least significant bits includes two least significant bits.

4. The execution unit of claim 3 wherein said first operand identifier unit provides a first, single bit condition code having a first state when both said first and second operands include integer type data portions, and having a second state when at least one of said first and second operands include a non-integer type data portion.

5. The execution unit of claim 4 wherein said first operand identifier unit includes a four input OR logic element.

6. The execution unit for claim 1 further including a second operand identifier unit, responsive to said result provided by said arithmetic logic unit means, for providing a second, single bit condition code in response to the operand tag identifier portion of at least one of said first and second operands as indicated by said result provided by said arithmetic logic unit means according to said first and second operands and the associated processor instruction.

7. The execution unit of claim 6 wherein said second operand identifier unit is responsive to a specified number of least significant bits of said result formed by said arithmetic logic unit means.

8. The execution of claim 7 wherein said specified number of bits includes three least significant bits of said result provided by said arithmetic unit means.

9. The execution unit of claim 8 wherein said second operand identifier unit provides a second single bit condition code having a first state when both said first and second operands include integer type data portions, and having a second state when at least one of said first and second operands include non-integer type data portions.

10. The execution unit of claim 9 wherein said second operand identifier unit provides said second, single bit condition code having said first state when both said first and second operands include integer type data portions, and having a second state when at least one of said first and second operands include a non-integer type data portion.

11. The execution unit of claim 10 wherein said second operand identifier unit includes a three input AND logic element.

12. A processor execution unit, for identifying and processing integer and non-integer data types, comprising:

means for providing first and second operands, each of said first and second operands including a data portion and a tag identifier portion, said tag identifier portion identifying the corresponding operand data portion as one of integer and non-integer data types;

means for sequentially providing processor instructions, at least one of said processor instructions defined as a proper instruction, said proper instruction properly executable on first and second operands having integer type data portions only;

arithmetic logic unit means, for sequentially receiving first and second operands and an associated processor instruction, and for providing a result according to said first and second operands and said associated processor instruction, said arithmetic logic unit means providing said result regardless of whether a given associated processor instruction is a proper instruction; and operand identifier means, responsive to a specified number of least significant bits of said result formed by said arithmetic logic unit means, for identifying the data type of at least one of said first and second operands, and for providing a single bit condition code in response to the data type identification of said at least one of said first and second operands, said single bit condition code forming at least part of a processor instruction branch indicator, for indicating that an improper processor instruction was executed in conjunction with at least one of said first and second operands, and for altering the sequence of processor instructions provided by said means for sequentially providing processor instructions.

* * * * *